(12) United States Patent
Huang

(10) Patent No.: US 7,905,675 B2
(45) Date of Patent: Mar. 15, 2011

(54) CONNECTING MEMBER

(75) Inventor: Wen-Hung Huang, Taipei County (TW)

(73) Assignee: Hannspree, Inc., Taipei (TW)

( * ) Notice: Subject to any disclaimer, the term of this patent is extended or adjusted under 35 U.S.C. 154(b) by 0 days.

(21) Appl. No.: 12/395,742

(22) Filed: Mar. 2, 2009

(65) Prior Publication Data
US 2010/0119298 A1    May 13, 2010

(30) Foreign Application Priority Data

Nov. 13, 2008   (TW) ................................ 97143821 A

(51) Int. Cl.
*F16B 7/08* (2006.01)
*F16B 9/00* (2006.01)
(52) U.S. Cl. ......... 403/168; 403/324; 403/325; 411/344
(58) Field of Classification Search ................... 403/168, 403/321, 324, 325; 411/343, 344
See application file for complete search history.

(56) References Cited

U.S. PATENT DOCUMENTS

| | | | | |
|---|---|---|---|---|
| 2,597,857 | A * | 5/1952 | Francis | 411/344 |
| 3,241,420 | A * | 3/1966 | Passer | 411/346 |
| 3,534,650 | A * | 10/1970 | Kubokawa | 411/344 |
| 5,855,450 | A * | 1/1999 | Richard et al. | 403/321 |
| 5,879,100 | A * | 3/1999 | Winkler | 403/325 |
| 6,336,765 | B1 * | 1/2002 | Watanabe | 403/325 |
| 6,390,722 | B1 * | 5/2002 | Godfrey et al. | 403/322.2 |
| 6,783,299 | B2 * | 8/2004 | Meron et al. | 403/325 |
| 6,840,703 | B2 * | 1/2005 | Blanchard | 403/322.2 |
| 6,884,012 | B2 * | 4/2005 | Panasik | 411/342 |

FOREIGN PATENT DOCUMENTS

| | | |
|---|---|---|
| TW | 459865 | 10/2001 |
| TW | M301919 | 12/2006 |

OTHER PUBLICATIONS

English abstract of TW M301919.
English abstract of TW 459865.

* cited by examiner

*Primary Examiner* — Daniel P Stodola
*Assistant Examiner* — Nahid Amiri
(74) *Attorney, Agent, or Firm* — Thomas | Kayden

(57) ABSTRACT

A connecting member includes a housing, a moving element slidably disposed within the housing and having an exposed portion exposed to the outer environment via the housing, an elastic element disposed between the movable element and an inner surface of the housing and biasing the movable element to position the movable element in a first position, at least one stopper disposed on the exposed portion and having an angle with respect to the housing, and a casing disposed on the housing. When the movable element is moved to a second position, the stopper deforms elastically and is received in the casing. When the casing and the housing pass through the connecting holes, the movable element is released and moved to the first position and the stopper escapes from the casing and abuts the soft substrate, whereby the device and the soft substrate are held between the stopper and the housing.

16 Claims, 8 Drawing Sheets

CONNECTING MEMBER

CROSS REFERENCE TO RELATED APPLICATIONS

This Application claims priority of Taiwan Patent Application No. 97143821, filed on Nov. 13, 2008, the entirety of which is incorporated by reference herein.

BACKGROUND OF THE INVENTION

1. Field of the Invention

The invention relates to a connecting member, and in particular relates to a connecting member joining a device to a soft substrate.

2. Description of the Related Art

There are many designs for connection of a device to a substrate in conventional technology. However, some designs are very complicated in structure, as disclosed in R.O.C. (Taiwan) Patent No. 301919, and others are not easily operated, as disclosed in T.O.C. (Taiwan) Patent No. 459865.

BRIEF SUMMARY OF INVENTION

An embodiment of connecting member of the invention for connecting a device to a soft substrate is disclosed. The device and the soft substrate have connecting holes for the connecting member to extend therethrough. The connecting member comprises a housing, a moving element slidably disposed within the housing and having a exposed portion exposed to the outer environment via the housing, an elastic element disposed between the movable element and an inner surface of the housing, the elastic element biasing the movable element, whereby the movable element is positioned in a first position, at least one stopper disposed on the exposed portion and having an angle with respect to the housing, and a casing disposed on the housing. When the movable element is pushed to move to a second position against the bias of the elastic element, the stopper deforms elastically and is received in the casing. When the casing and the housing pass through the connecting holes, the movable element is released and moved to the first position and the stopper escapes from the casing and abuts the soft substrate by having an angle with respect to the housing, whereby the device and the soft substrate are held between the stopper and the housing.

The length of the stopper is longer than the radius of the connecting hole.

The housing comprises a bottom which is a circular plate and having an opening, a first step portion which is cylinder-shaped and connected to the bottom, a second step portion which is cylinder-shaped, having a diameter smaller than the diameter of the first step portion and which is connected to the first step portion to form a first shoulder, and a third step portion which is cylinder-shaped, having a diameter smaller than the diameter of the second step portion and which is connected to the second step portion to form a second shoulder, wherein the axes of the first step portion, the second step portion and the third step portion are collinear, and the diameter of the second step portion is smaller than the diameter of the connecting hole. The third step portion has a groove by which the exposed portion is exposed to the outer environment, and the stopper is disposed on the exposed portion and extends outward via the groove. When the movable element moves between the first and second positions, the stopper moves along the groove.

The groove is parallel to the axis of the third step portion. When the movable element is in the first position, the stopper is near the second shoulder.

The casing is a cone frustum and has a first end with a smallest diameter and a second end with a largest diameter. The first end is fixed to the end of the third step portion, the casing is joined to the third step portion, and the second end is near the second shoulder. The diameter of the second end is equal to the diameter of the second step portion.

The elastic element is biased between the movable element and an inner wall of the second shoulder.

The movable element comprises a push portion, an abutting portion and an extending portion. The push portion is exposed to the outer environment via the opening. The movable element is moved between the first and second positions by pushing the push portion. The abutting portion is connected to the push portion. When the movable element is in the first position, the abutting portion abuts the bottom. When the movable element is in the second position, the abutting portion abuts an inner surface of the first shoulder, and an extending portion extending from the abutting portion and enters the third step portion. The exposed portion is on the extending portion and the third step portion has a groove by which the exposed portion is exposed to the environment via the groove, and the stopper is fixed to the exposed portion.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

Figure 1:
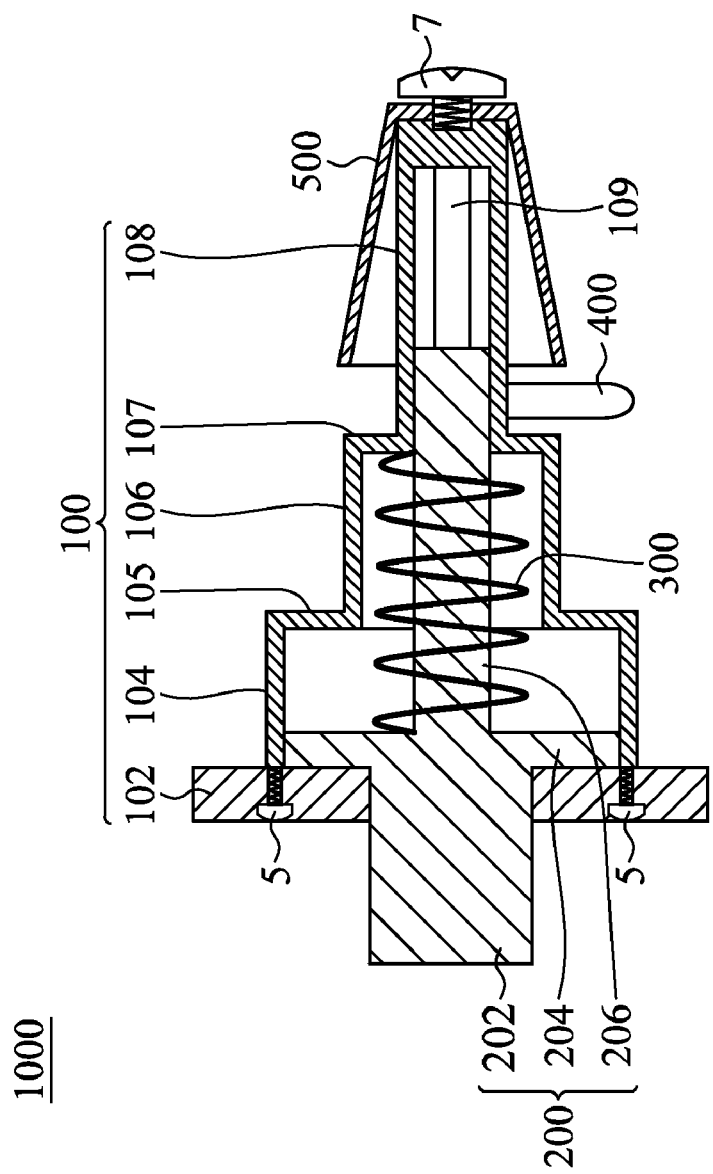
FIG. 1 is a cross-sectional view of a connecting member of the invention.
Figure 2:
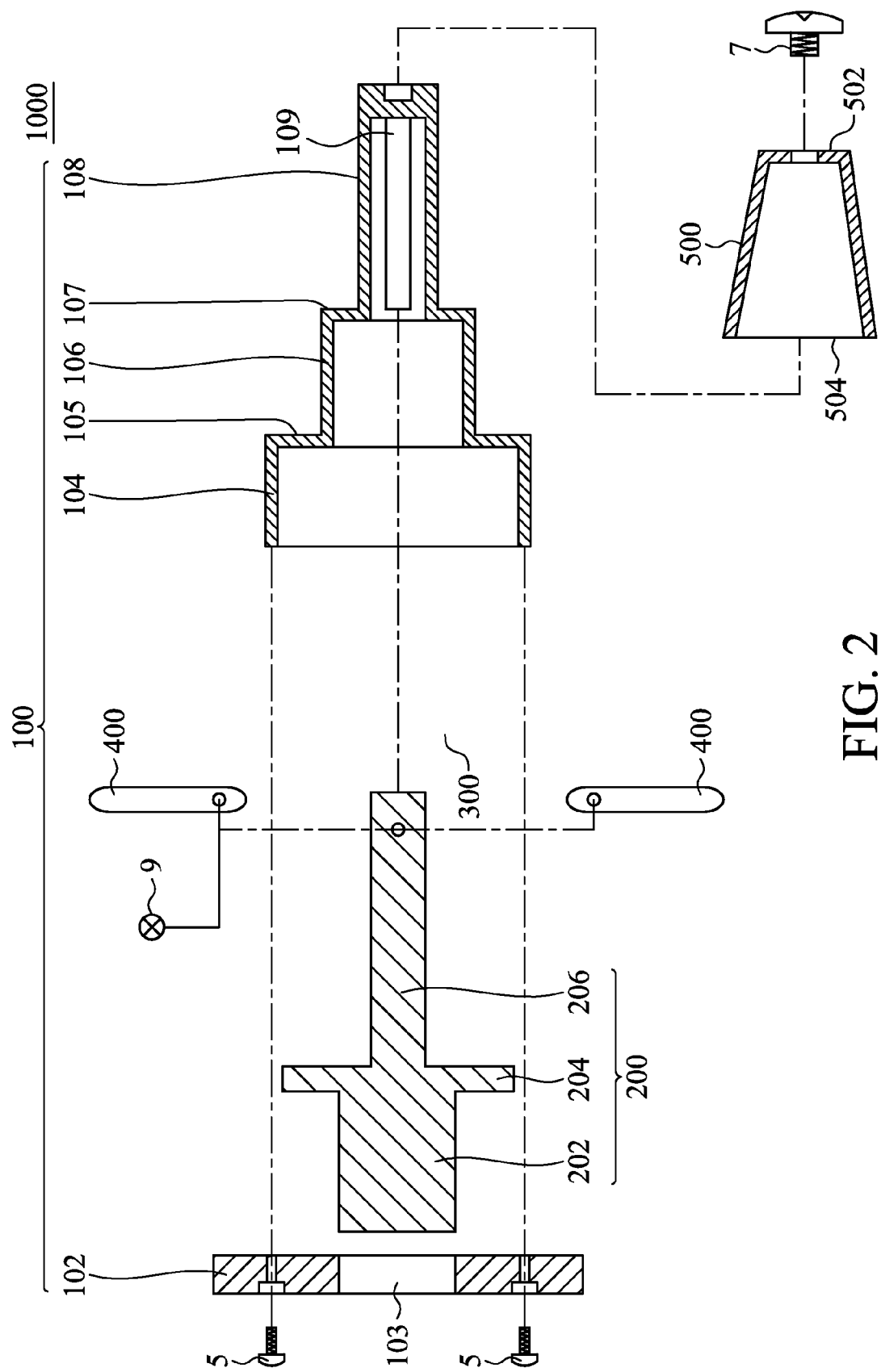
FIG. 2 is an exploded view of the connecting member of the invention.

Referring to FIGS. 1 and 2, a connecting member 1000 comprises a housing 100, a movable element 200, an elastic element (compression spring) 300, two stoppers 400 and a casing 500.

Figure 3:
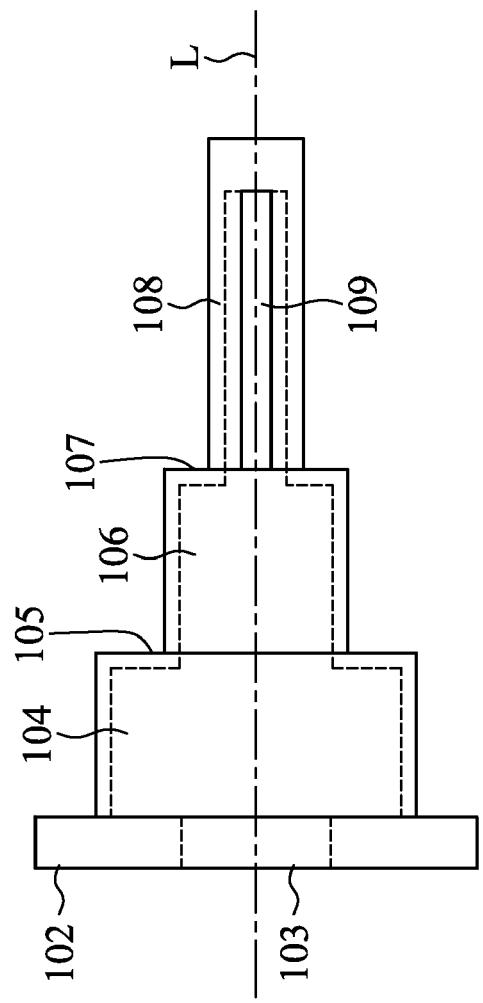
FIG. 3 is a cross-sectional view of a housing of the connecting member of the invention.
Figure 4:
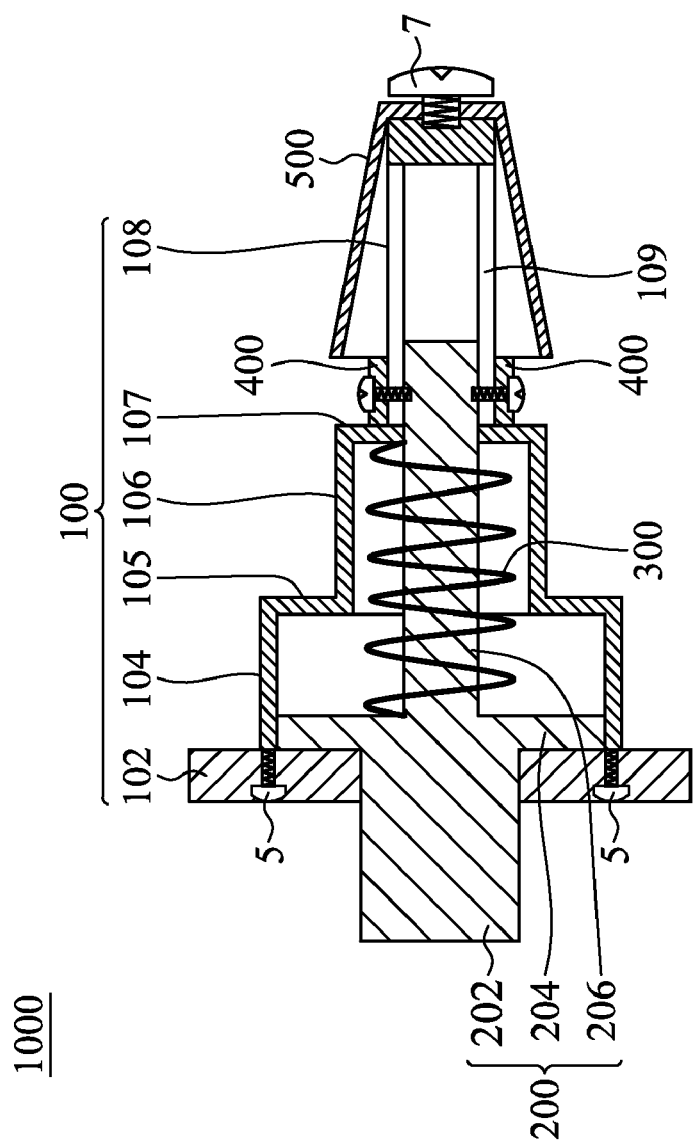
FIG. 4 is a cross-sectional view of the connecting member of the invention.

Referring to FIG. 3, the housing 100 comprises a bottom 102, a first step portion 104, a second step portion 106 and a third step portion 108. The bottom 102 is a circular plate and has an opening 103. The first step portion 104, the second step portion 106 and the third step portion 108 are tube-shaped. As shown in FIG. 2, the first step portion 104 is fixed to the bottom 102 by bolts 5. The second step portion 106 is joined with the first step portion 104. As the diameter of the first step portion 104 is longer than the diameter of the second step portion 106, a first shoulder 105 is formed by the joining of the first step portion 104 and the second step portion 106. The third step portion 108 is joined with the second step portion 106. As the diameter of the second step portion 106 is longer than the third step portion 108, a second shoulder 107 is formed by the joining of the second step portion 106 and the third step portion 108. The axes L of the first step portion 104, the second step portion 106 and the third step portion 108 are collinear. In addition, a groove 109 parallel to the axis L of the third step portion 108 is formed on the third step portion 108 showing in FIG. 3.

The movable element 200, as shown in FIG. 2, comprises a push portion 202, an abutting portion 204 and an extending portion 206. The abutting portion 204 is between the push portion 202 and the extending portion 206. The movable portion 200 is slidably disposed in the housing 100 as shown in FIG. 1. The push portion 202 is exposed to the outer environment via the opening 103 of the bottom 102. The diameter of the opening 103 is substantially equal to the diameter of the push portion 202. The movable element 200 can move in a direction parallel to the axis L of the housing 100. The elastic element 300 biases the abutting portion 204 and an inner surface of the second shoulder 107, whereby the abutting portion 204 abuts the bottom 102. At this time, the movable element 200 is positioned in a first position. The extending portion 206 extends from the abutting portion 204 to pass the first step portion 104, the second step portion 106 and finally enter the third step portion 108. As the groove 109 is formed on the third step portion 108, a part of the extending portion 206 (exposed portion) is exposed to the outer environment, whereby the two stoppers 400 are fixed to the extending portion 206 by bolts 9. When the movable element 200 moves in the housing 100, the stopper 400 moves along the groove 109 of the third step portion 108. In this embodiment, the stopper 400 is perpendicular to the third step portion 108.

As shown in FIG. 2, the casing 500 is a cone frustum shape and has a first end 502 with a smaller diameter and a second end 504 with a longer diameter. The casing 500 is hollow and has a surface on the first end 502. The casing 500 holds the third step portion 108 with the first end 502 which is fixed to the end of the third step portion 108 by a bolt 7, whereby the second end 504 is near the second shoulder 107. The diameter of the second end 504 is substantially equal to the diameter of the second step portion 106. The stopper 400 is located between the second end 504 and the second shoulder 107.

Figure 5:
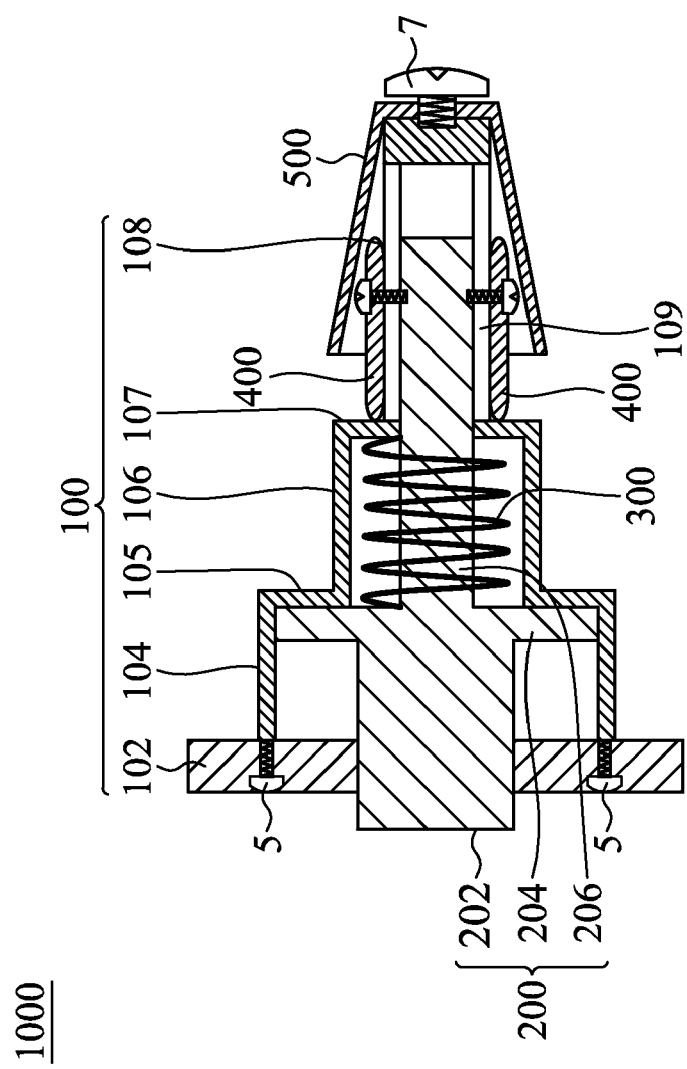
FIG. 5 depicts of a cross-sectional view of a pushed push portion of the connecting member.

As shown in FIG. 5, when the push portion 202 is pushed in, the movable element 200 slides parallel to the axis of the housing until the abutting portion 204 abuts an inner surface of the first shoulder 105. At this time, the movable element 200 is in a second position. The elastic element 300 is compressed. When the stopper 400 enters the casing 500, the stopper 400 is pushed by the casing 500 and deforms elastically and bends, whereby the stopper 400 is received in the casing 500. When the push portion 202 is released, the elastic element 300 pushes the abutting portion 204 to move the movable element 200 back to the first position. The stopper 400 escapes from the casing 500 to become perpendicular to the third step portion 108.

Figure 6:
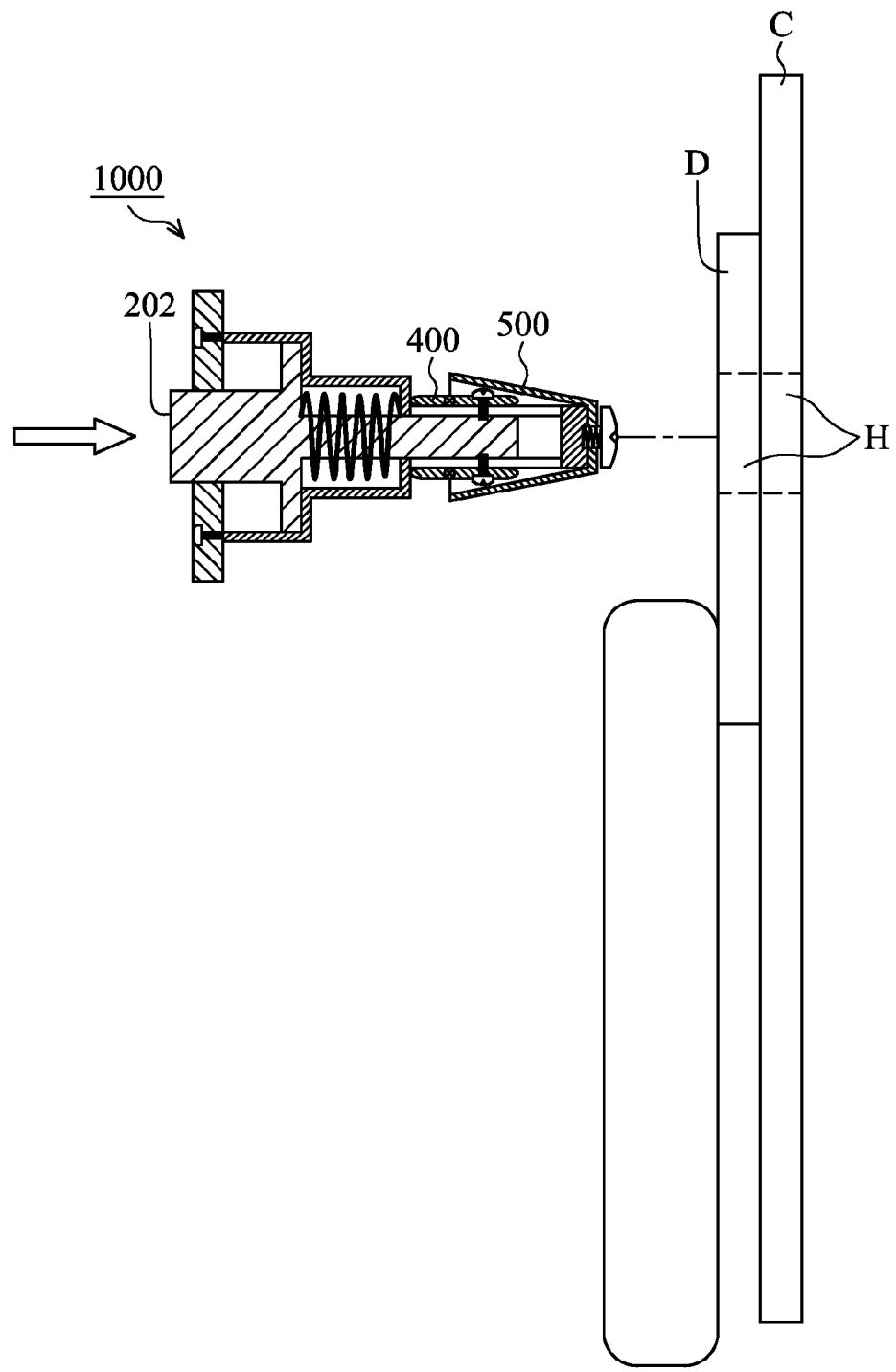
FIGS. 6, 7 and 8 depict of a cross-sectional view of the connecting member connecting a display device to a tapestry.
Figure 7:
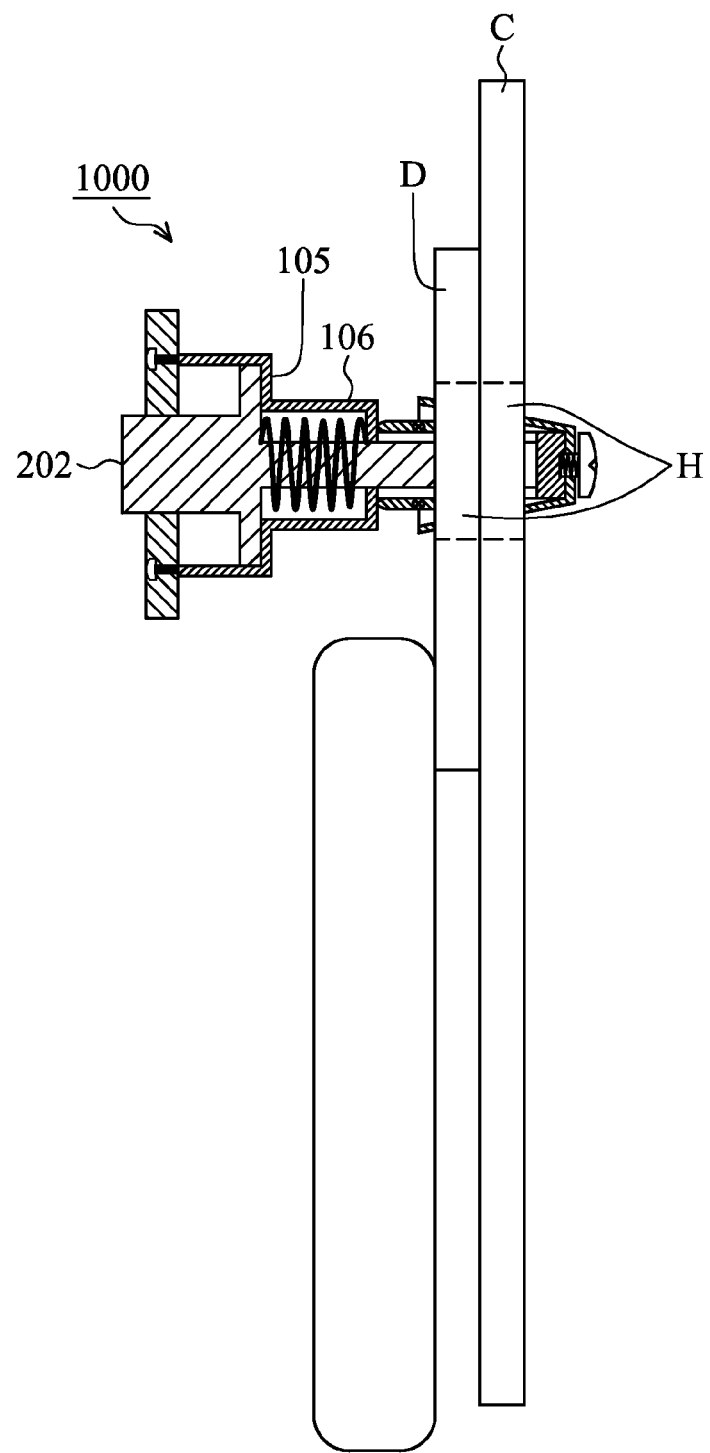
Figure 8:
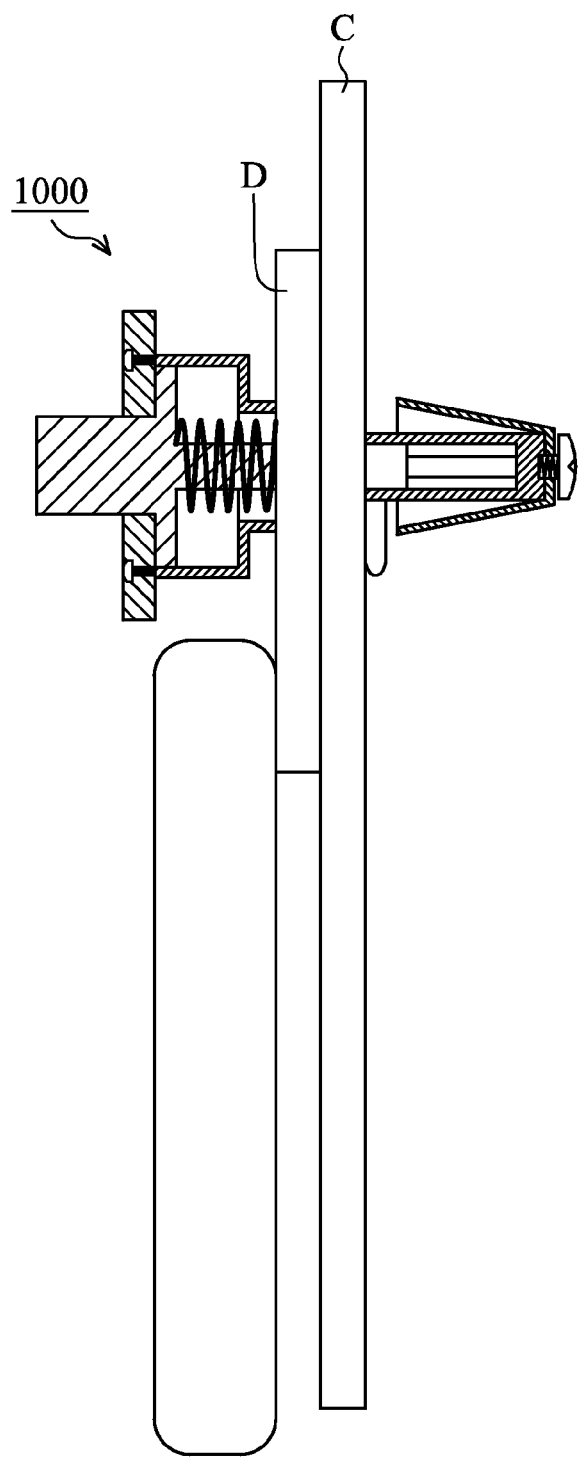

Referring to FIGS. 6, 7 and 8, the connecting member 1000 is applied to connect a display device D to a tapestry C. First, the push portion 202 is pushed to make the stopper 400 to be received in the casing 500 as shown in FIG. 6. The connecting member 1000 passes through the connecting holes H of the display device D and the tapestry C, as shown in FIG. 7. When the second step portion 106 pass through the connecting holes H and the display device D abuts the first shoulder 105, the push portion 202 is released, whereby the stopper 400 escapes from the casing 500 to be recovered to be perpendicular to the third step portion 108. The display device D and the tapestry C are positioned between the first shoulder 105 and the stopper 400, whereby the display device D and the tapestry C are held by the first shoulder 105 and the stopper 400, as shown in FIG. 8.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A connecting member for connecting a device to a soft substrate, wherein the device and the soft substrate having connecting holes for the connecting member to extend therethrough, comprising:

a housing;

a movable element slidably disposed within the housing and having an exposed portion exposed to the outer environment via the housing;

an elastic element disposed between the movable element and an inner surface of the housing, wherein the elastic element biases the movable element, whereby the movable element is positioned in a first position;

at least one stopper disposed on the exposed portion and having an angle with respect to the housing; and a casing disposed on the housing, wherein when the movable element is pushed to move to a second position against the bias of the elastic element, the at least one stopper deforms elastically and is received in the casing, and when the casing and the housing pass through the connecting holes, the movable element is released and moved to the first position and the at least one stopper escapes from the casing and abuts the soft substrate by having an angle with respect to the housing, whereby the device and the soft substrate are held between the stopper and the housing;

wherein the housing comprises:

a bottom which is a circular plate and having an opening;

a first step portion which is cylinder-shaped and connected to the bottom;

a second step portion which is cylinder-shaped, having a diameter smaller than the diameter of the first step portion and which is joined to the first step portion to form a first shoulder; and a third step portion which is cylinder-shaped, having a diameter smaller than the diameter of the second step portion and which is joined to the second step portion to form a second shoulder, wherein the axes of the first step portion, the second step portion and the third step portion are collinear, and the diameter of the second step portion is smaller than the diameter of the connecting holes.

2. The connecting member as claimed in claim 1, wherein the length of the at least one stopper is longer than the radius of the connecting holes.

3. The connecting member as claimed in claim 1, wherein the third step portion has a groove by which the exposed portion is exposed to the outer environment, and the stopper is disposed on the exposed portion and extends outward via the groove, and when the movable element moves between the first and second positions, the at least one stopper moves along the groove.

4. The connecting member as claimed in claim 3, wherein the groove is parallel to the axis of the third step portion, and when the movable element is in the first position, the at least one stopper is near the second shoulder.

5. The connecting member as claimed in claim 3, wherein the at least one stopper is fixed to the movable element by bolts.

6. The connecting member as claimed in claim 3, wherein the casing is a cone frustum and has a first end with a smaller diameter and a second end with a larger diameter, and the first end is fixed to the end of the third step portion, the casing is joined to the third step portion, and the second end is near the second shoulder.

7. The connecting member as claimed in claim 6, wherein the diameter of the second end is equal to the diameter of the second step portion.

8. The connecting member as claimed in claim 3, wherein the elastic element is biased between the movable element and an inner wall of the second shoulder.

9. The connecting member as claimed in claim 8, wherein the elastic element is a compression spring.

10. The connecting member as claimed in claim 1, wherein the movable element comprises:
    a push portion exposed to the outer environment via the opening, wherein the movable element is moved between the first and second positions by pushing the push portion;
    an abutting portion connected to the push portion, wherein when the movable element is in the first position, the abutting portion abuts the bottom, and when the movable element is in the second position, the abutting portion abuts an inner surface of the first shoulder; and
    an extending portion extending from the abutting portion and entering the third step portion, wherein the exposed portion is on the extending portion and the third step portion has a groove by which the exposed portion is exposed to the environment via the groove, and the stopper is fixed to the exposed portion.

11. The connecting member as claimed in claim 10, wherein the elastic element is biased between the movable element and an inner wall of the second shoulder.

12. The connecting member as claimed in claim 11, wherein the elastic element is a compression spring.

13. The connecting member as claimed in claim 10, wherein the push portion has a diameter substantially equal to the diameter of the opening.

14. The connecting member as claimed in claim 10, wherein the axis of the movable element is collinear with the axes of the first, second and third step portions.

15. The connecting member as claimed in claim 1, wherein when the device is joined to the soft substrate, the device and the soft substrate are positioned between the second shoulder and the stopper.

16. The connecting member as claimed in claim 1, wherein the stopper is perpendicular to the housing when the movable element is not pushed to the second position.

\* \* \* \* \*